United States Patent [19]

Smolinske et al.

[11] Patent Number: 5,426,643
[45] Date of Patent: Jun. 20, 1995

[54] APPARATUS AND METHOD FOR TRANSMITTING BIT SYNCHRONOUS DATA OVER AN UNRELIABLE CHANNEL

[75] Inventors: Jeffrey C. Smolinske, Hoffman Estates; Phieu M. Tran, Lincolnwood, both of Ill.

[73] Assignee: Motorola Inc., Schaumburg, Ill.

[21] Appl. No.: 146,672

[22] Filed: Nov. 1, 1993

[51] Int. Cl.⁶ ............................................. H04J 3/06
[52] U.S. Cl. ............................. 370/105.3; 370/100.1; 375/354
[58] Field of Search ............... 370/100.1, 105.1, 105.3; 375/114, 111, 119, 112, 106

[56] References Cited

U.S. PATENT DOCUMENTS

| | | | |
|---|---|---|---|
| 4,740,962 | 5/1988 | Kish, III | 370/105.3 |
| 4,803,726 | 2/1989 | Levine et al. | 380/48 |
| 4,977,596 | 12/1990 | Maestas et al. | 370/100.1 |
| 5,020,057 | 5/1991 | Taniguchi et al. | 370/100.1 |
| 5,128,939 | 7/1992 | Takatori et al. | 370/100.1 |
| 5,243,653 | 9/1993 | Malek et al. | 380/48 |

OTHER PUBLICATIONS

"Data Communication Networks Transmission, Signalling and Switching, Network Aspects, Maintenance and Administrative Arrangements", CCITT Vol. VIII—Fascicle VIII.4, Recommendations X.40–X.181, Geneva 1985, pp. 336–343.

Comer, Douglas E., "Interworking with TCP/IP vol. I: Principles, Protocols, and Architecture, Second Edition", 1991, pp. 171–184.

Primary Examiner—Douglas W. Olms
Assistant Examiner—Ajit Patel
Attorney, Agent, or Firm—Dale B. Halling; John J. King

[57] ABSTRACT

Data transmission with bit synchronism over an unreliable channel is accomplished by assigning a unique number to each data byte transmitted in a data packet. From this unique number, each data bit may be identified at the packet receiver. When a data packet is missing or uncorrected, the missing data bits are identified and a fill data bit is supplied to the data sink at the time each missing data bit would have been supplied.

11 Claims, 5 Drawing Sheets

APPARATUS AND METHOD FOR TRANSMITTING BIT SYNCHRONOUS DATA OVER AN UNRELIABLE CHANNEL

FIELD OF THE INVENTION

The present invention generally relates to data transmission over an unreliable channel and more particularly relates to bit synchronous data packet transmission.

BACKGROUND OF THE INVENTION

Users of wireless telephone services expect that their messages shall be reliably conveyed from the subscriber unit (SU)to the fixed equipment and from the fixed unit through the public switched telephone network (PSTN) to the intended receiver of the message. Digital radio transmission techniques have evolved for carrying the user's messages over the unreliable radio link with good reliability by introducing error correction and acknowledgement of received data. Uncorrectable or unacknowledged data may be retransmitted to ensure receipt of the message.

Some devices which use wireless telephone services require bit synchronization to maintain operation. One such device is a secure telephone instrument commonly called a STU III secure telephone (an example of which is the SECTEL 1500 model, available from Motorola, Inc., Government Electronics Group P.O. Box 9040 Scottsdale, Ariz. 85252). The STU III "black digital" protocol is defined in National Security Agency (NSA) document FSVS-211 for STU III instruments. Further, a protocol which is often employed in connection oriented protocols typically used on connectionless networks for data packet delivery is known as Transmission Control Protocol (TCP) and is particularly useful over complex communication networks. The standard for data formats and procedures in a TCP is specified in part of the TCP/IP suite of communications protocols and is defined in RFC 793, RFC 761, RFC 675 and other RFC's (Request For Comments) available from the Network Information Center at SRI International.

Briefly, TCP conveys data packets organized into a plurality of 8-bit octets (bytes) for each packet. The packets are numbered so that packets are delivered to the receiver in order even though some packets may have become disordered due to network delays or due to the need to request retransmission of a packet. Typically, such retransmission is based upon a lack of a positive acknowledgement by the receiver. See, for example CCITT Recommendation X-141 "General Principles for the Detection and Correction of Errors in Public Data Networks" (1984) for a discussion of the acknowledgement process (ARQ).

While the foregoing protocols provide reliable packet delivery, timely bit-synchronous data transmission is not realized. Bit-synchronous communication devices, such as the STU III variety, will lose synchronism without a reliable input of data bits.

DETAILED DESCRIPTION OF A PREFERRED EMBODIMENT

Figure 1:
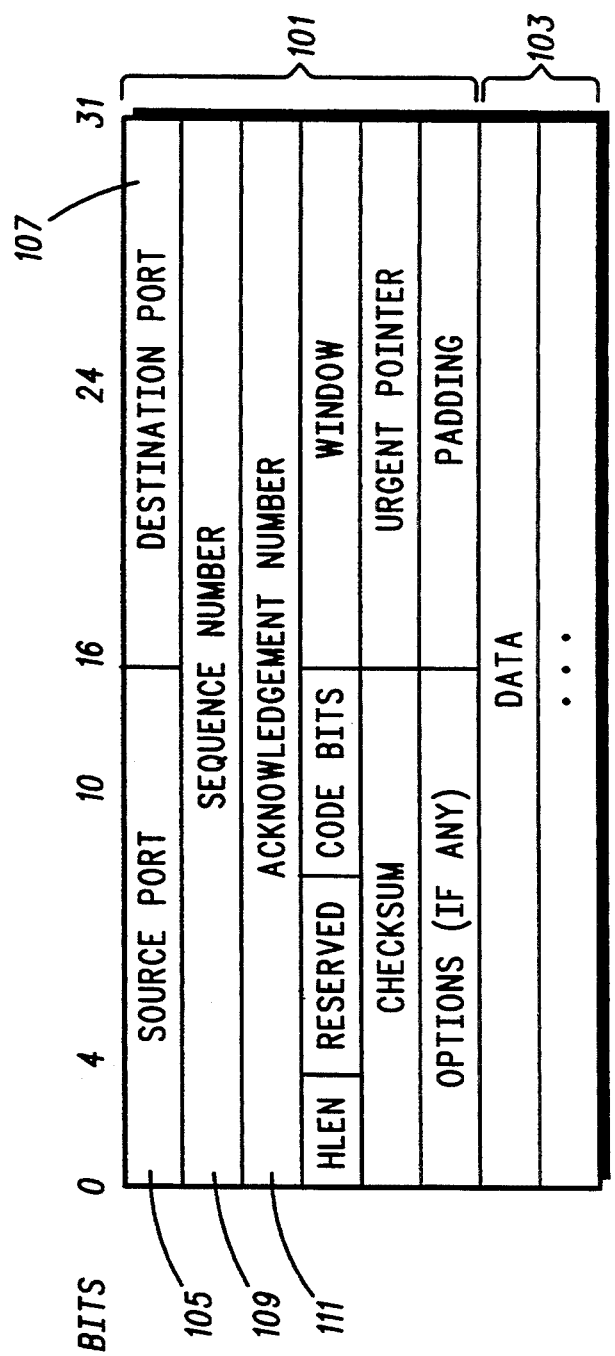
FIG. 1 is a diagram illustrating the format of a conventional TCP packet.

A system which utilizes bit synchronicity for a radiotelephone system coupled to the PSTN, such as a Personal Communications System (PCS), may advantageously employ the present invention. The communication system of the preferred embodiment utilizes a data packet transmission technique (a conventional TCP packet format is shown in FIG. 1. It is structured with a multipart header 101 followed by the message data 103 of a length determined by the application. The Source Port 105 and the Destination Port 107 of the header 101 identify the two ends of the data connection. The Sequence Number 109 identifies the position the message data segment 103 occupies in the message sender's outbound byte stream and the Acknowledgement Number 111 identifies the number of the octet that the sender of this packet expects to receive from the receiver of this packet in the inbound byte stream).

Figure 2:
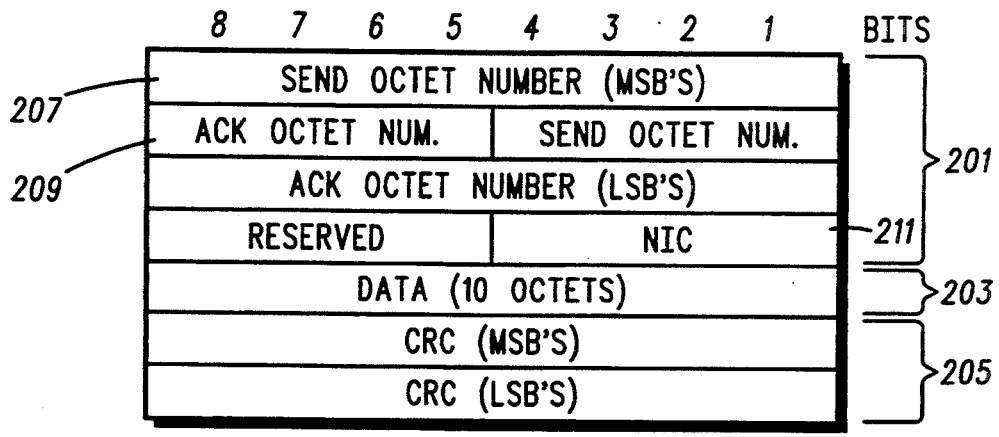
FIG. 2 is a diagram illustrating the format of a TCP packet which may be employed in the present invention.

A packet format employed in the preferred embodiment is shown in FIG. 2. The packet is organized into 8-bit bytes and includes a header 201, the message data 203, and error correction fields 205. It is an important feature of the present invention that the header 201 includes the octet number 207 of the message data 203 of this packet in the outbound byte stream and the acknowledge octet number 209 of the expected next octet.

Figure 3:
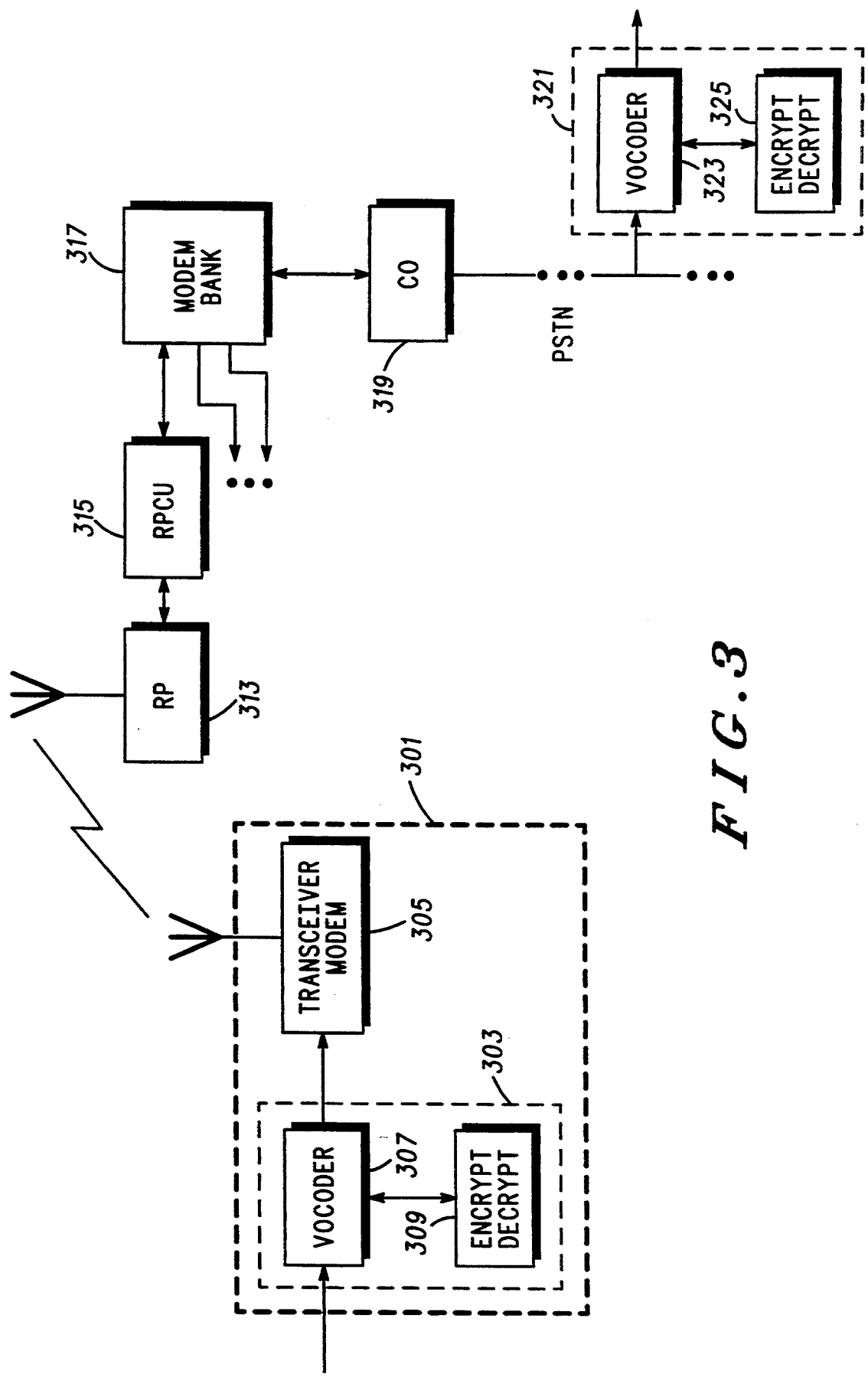
FIG. 3 is a block diagram of a wireless telephone system which may employ the present invention.

A wireless telephone system which may employ the present invention is shown in FIG. 3. This PCS system is designed to provide a wide range of data services supporting interworking with the PSTN, the ISDN (Integrated Services Digital Network), and a variety of PSDN's (Packet Switched Data Network). A subscriber unit (SU) 301 in the preferred embodiment includes a secure telephone instrument 303, such as the STU-III SECTEL 1500, and a digital radio transceiver and modem 305. Audio which is to be transmitted from the SU 301 is input to a vocoder 307 of the secure telephone instrument 303 where the audio is converted from an analog signal to a digital format and encrypted, using the NSA FSVS-211 protocol, into a bit synchronous data stream. This data stream is applied to the transceiver and modem 305 for packetizing and radio transmission.

In the PCS system of the preferred embodiment, the radio link from the SU 301 is made to fixed radio transceiver, a Radio Port (RP) 313. The RP 313 is coupled to a radio system controller, a Radio Port Control Unit (RPCU) 315, for radiotelephone call establishment and maintenance. A modem bank 317 is coupled to RPCU 315 and such other RPCUs in the PCS radiotelephone system which require data modulation/demodulation. The modem bank is coupled to a class 5 Central Office (CO) 319 or its equivalent for interconnection to the Public Switched Telephone Network (PSTN). A companion secure telephone instrument 321 (having compatible vocoder 323 and decryption 325 capability) is conventionally coupled to the PSTN and provides a clear-speech audio output which has been conveyed, end-to-end via a secure channel. The connection between secure telephone instruments 301 and 321 is a duplex connection, so audio is similarly input to secure telephone instrument 321 for secure conveyance to secure telephone instrument 301.

In the preferred embodiment, the STU III secure telephone is supported at data rates up to 9600 bps via a STU III Interworking Function in the network PSTN and is supported over the air interface by a LAPR (Link Access Protocol Radio) protocol operating in Bit Synchronous mode. (The network may also provide STU III secure telephone on the standard 32K ADPCM PCS audio channel at rates up to 4800 bps).

LAPR is a framing, rate adaptation, and optional ARQ protocol used to transfer user information on a circuit mode data channel. The basic LAPR protocol is very similar to those defined by the CCITT V.120 and V.42 interface specifications. LAPR supports three modes of data transport: multi-framing mode (uses ARQ to provide a minimum bit error rate); unacknowledged mode (no ARQ); and Bit Synchronous mode (provides a bit accurate, fixed delay between the source user data stream and the reconstructed user data stream while providing the best bit error rate possible using a modified ARQ scheme).

The data formats and procedures used in LAPR are derived from Q.921 LAPD and V.42 LAPM to provide proper and efficient operation over the harsh PCS radio link. The LAPR Bit Synchronous Mode of operation supports bit transparent synchronous data streams with bit count integrity requirements. This operating mode is designed to maintain a bit accurate, fixed delay between the source serial data stream and the reconstructed serial data stream. This bit accurate, fixed delay is maintained even through data loss gaps whose duration exceeds the delay length. The LAPR bitsync uses a frame structure different from that of the multi-framing or unacknowledged modes and is shown in FIG. 2.

The bit-sync mode header contains Send and Ack Octet Numbers 207 and 209, which serve as ARQ sequence variables. The Send Octet Number 207 also serves as a bit timing reference for the receiver of the LAPR frame. The network independent clock (NIC) field 301 allows the LAPR receiver to maintain an accurate bit clock frequency on the reconstructed serial data stream. The Send Octet Number 207 is used along with the network independent clock information to maintain an accurate bit count between the rate adaptation units in the subscriber unit and the IWF. The use of 12 bit octet numbers enables the protocol to maintain unambiguous bit count integrity through data gaps (including a time slot transfer and an automatic link transfer) of up to 1.7 seconds at a user data rate of 9600 bps.

The establishment of both mobile originated and mobile terminated STU III interworked calls in the preferred embodiment are supported via parameters in the CALL REQUEST and INCOMING CALL messages of the PCS air interface signaling protocol. Call set up procedures for digital data calls utilizing a dedicated traffic channel are identical to procedures typically used for voice calls up to and including the SU 301 sending the $CALL_{13}$ REQUEST (or the SU 301 receiving a INCOMING_CALL) message. For example, an SU 301 originated data call setup commences upon the RPCU 315 receiving a $CALL_{13}$ REQUEST message from the SU 301 via the air interface. The RPCU 315 responsively examines a bearer capability message. From its preestablished information transfer capabilities, the RPCU 315 determines if the data call is non-transparent (restricted) or transparent (non-restricted). If the call is restricted, the RPCU 315 sets up the LAPR ARQ procedures for the Air Interface. If the call is non-restricted, the RPCU bypasses the LAPR procedures.

Figure 4:
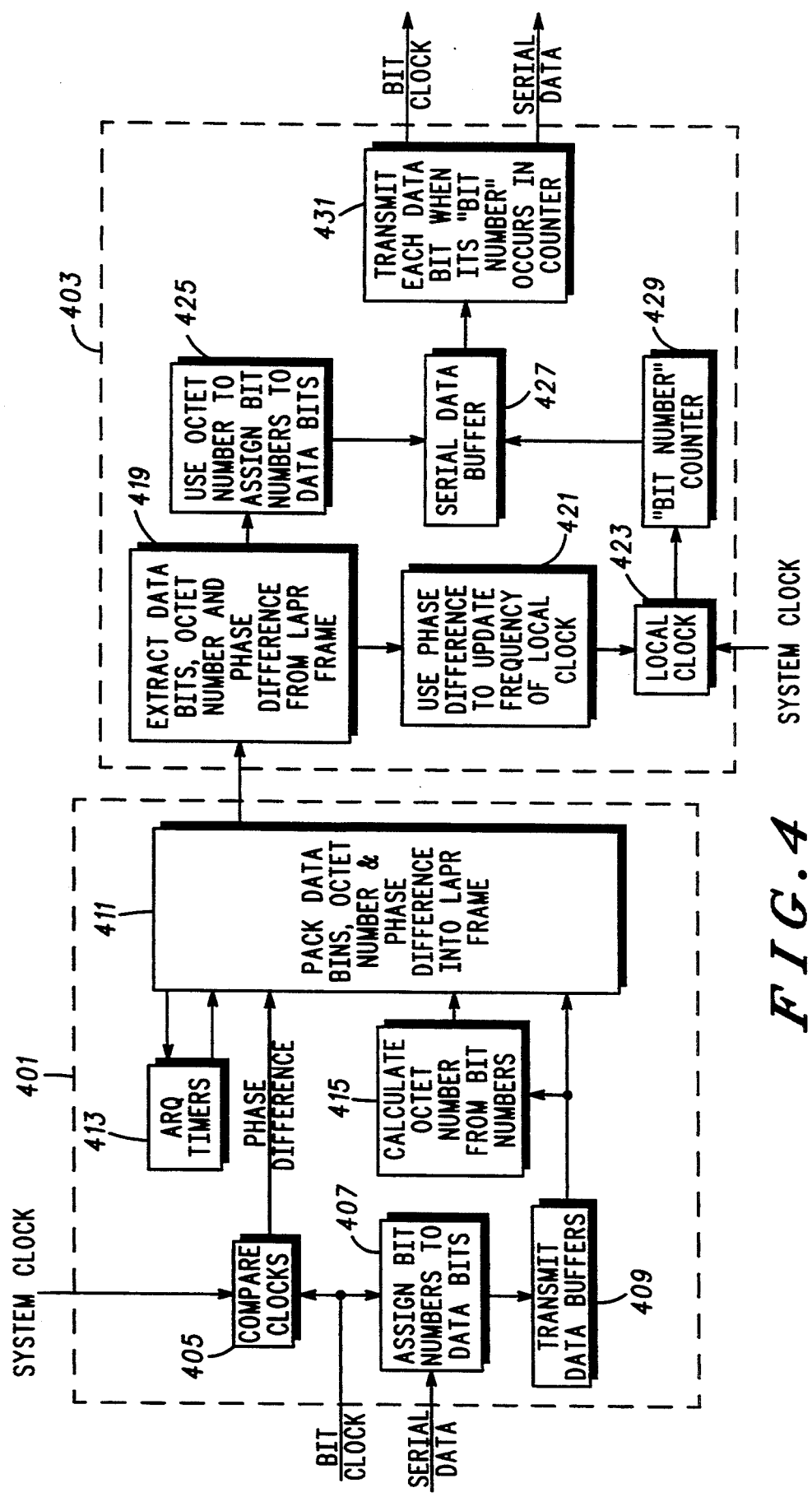
FIG. 4 is a function diagram of the process of bit synchronous packet communication which may be employed in the present invention.

The process of bit synchronous packet communication with bit timing information being conveyed between a data transmitter 401 and a data receiver 403 is shown in the function diagram of FIG. 4. The user data stream is received serially by the LAPR Transmitter 401 on the Serial Data line. Transitions on the Bit Clock line notify the LAPR Transmitter 401 of the arrival of each user data bit. The clock transitions are also compared to the system clock by Compare Clocks 405 and a clock phase difference is calculated. As each user serial data bit is received, it is assigned a bit number by Assign Bit Numbers to Data Bits 407 and then is stored in the TX Data Buffer 409. The Pack Data Bits, Octet Number, and Phase Difference into LAPR frame function 411 operates periodically in synchronization with the system clock. When it operates, it obtains information about which user data bits are to be transmitted from the ARQ Timers 413. The ARQ timers are then updated to indicate that a new range of user data bit numbers has been transmitted. The Pack Data Bits, Octet Number, and Phase Difference into LAPR frame function 411 then extracts the appropriate user data bits from the TX Data Buffer 409 and groups the user data bits into octets. The user bit numbers are converted a octet numbers by Calculate Octet Number from Bit Numbers 415. A LAPR frame is then constructed using the user data bits, the clock phase difference, and a Send Octet Number, which is the greatest of the octet numbers corresponding to the user data bits in the LAPR frame.

The transmitted. LAPR frame is received by the LAPR Receiver 403. The clock phase difference is extracted by Extract Data Bits, Octet Number, and Phase Difference function 419 from the received LAPR frame and is used by Use Phase Difference to Update Frequency of Local Clock 421 to update the Local Clock 423 frequency relative to the System Clock. The Send Octet Number is extracted from the LAPR frame along with the user data bits and is used to reassign the bit numbers to the user data bits in Use Octet Number to Assign Bit Numbers to Data Bits 425. The user data bits and their corresponding bit numbers are stored in the Serial Data Buffer 427. The "Bit Number" Counter 429 is a numeric counter which is triggered to increment its bit number value by one on every transition of the Local Clock. The bit number value from the "Bit Number" Counter 429 is used to match the user data bit in the Serial Data Buffer 427 with the same bit number. This user data bit is then transmitted on the Serial Data line by Transmit Each Data Bit When Its "Bit Number" Occurs In Counter function 431. If no user data bit in the Serial Data Buffer 427 has a bit number that matches the bit number value in the "Bit Number" Counter 429, the Transmit Each Data Bit When Its "Bit Number" Occurs In Counter 431 function transmits a "fill" bit instead. Thus the bit synchronicity is maintained even in the absence of message data bits.

Figure 5:
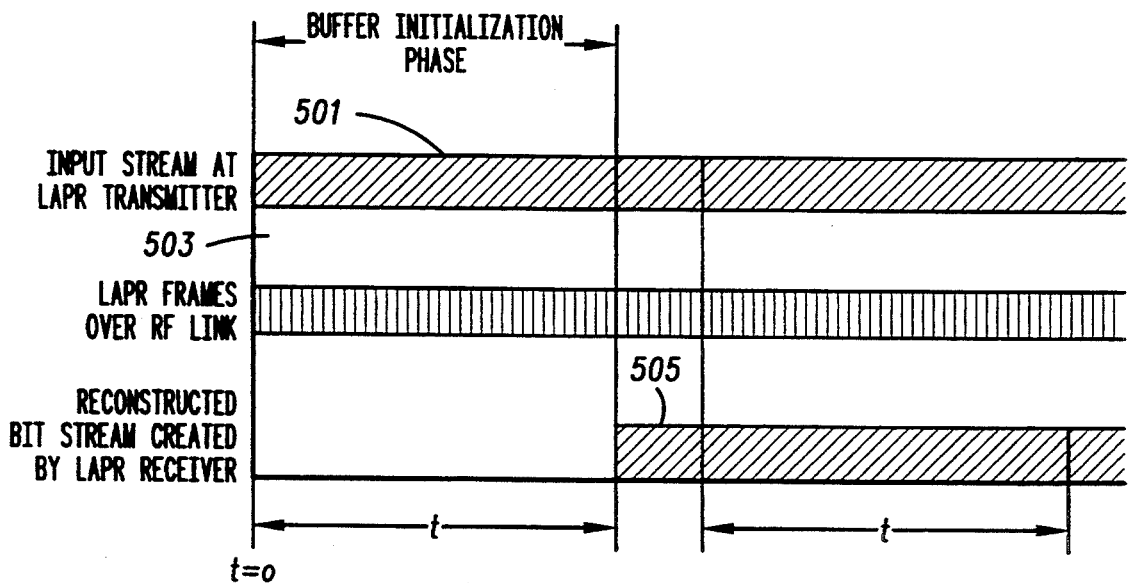
FIG. 5 is a timing diagram of the bit sync mode timing relationship which may be employed in the present invention.

The bit sync mode timing relationship is shown in the timing diagram of FIG. 5. A message input bit stream 501 is input to the LAPR transmitter at a time t=0. LAPR data frames are composed and transmitted over the radio link as depicted as 503. A reconstruction of the originally input bit stream 505 is recreated at the LAPR receiver. LAPR bit sync mode operation begins with a Buffer Intialization phase followed by the data transfer phase. A fixed delay, T, between the input user data stream and the reconstructed user data stream is established by the duration of the Buffer Initialization phase and is determined by the system designer. Of course, this fixed delay can be no longer than the size of the physical buffer, itself, and is usually set to be a fraction of the buffer size. The LAPR bit-sync protocol then maintains the exact same delay to a bit level accuracy through the remainder of the data session. It is an important feature of the present invention that if data is not available to the LAPR receiver at the time when the data is to be inserted into the reconstructed user data stream, the LAPR substitutes appropriate fill bits. The user data bits replaced by the fill bits are acknowledged by the LAPR receiver even though they were not received over the air interface. Subsequent user data bits received in time to be inserted into the reconstructed user data stream are transmitted on the reconstructed user data stream at the correct time to maintain the fixed delay value established by the Buffer Initialization phase. This is accomplished by the LAPR receiver using the Send Octet Number and its local data clock to determine the correct bit timing.

Figure 6:
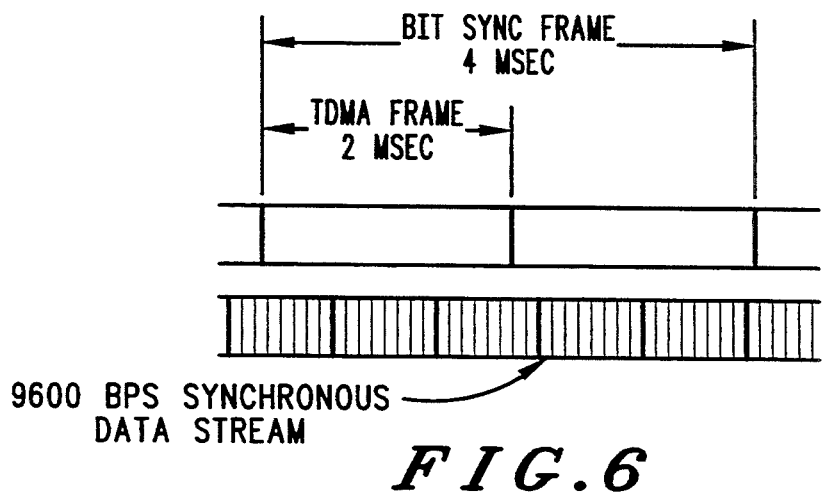
FIG. 6 is a timing diagram of the framing of the LAPR bit sync mode which may be employed in the present invention.

As seen in FIG. 6, the LAPR bit sync mode operates on a 4 millisecond frame, where the LAPR frame is comprised of two TDMA bursts. The bit sync mode frame is 16 octets long. The first 4 octets contain the LAPR bit sync frame header and the last 2 octets contain the CRC. The remaining 10 octets contain the data payload. At 9600 bps, during the 4 msec LAPR frame either 38 or 39 bits will be received from the user data stream. These received bits are arbitrarily grouped into octets and put into the first bit locations in the payload portion of the LAPR frame. Only complete octets are put into the payload. The remaining portion of the payload is filled with the consecutively previous bits received from the user data stream. Thus, the payload always contains 80 bits of user payload consisting of consecutive bits from the user data stream. The Send Octet Number 207 is filled with the octet number, modulo 4096, of the first octet in the payload. The Ack Octet Number 209 is filled with the value of the variable V(R). At 9600 bps under good radio link conditions, all user data bits are thus retransmitted at least once and many are retransmitted twice. When starting the data stream, the undefined portion of the payload is filled with zeroes.

At the receiver, the LAPR frames are checked for valid CRC. If the CRC is invalid, the payload is discarded and the V(R) variable is not updated. If the CRC is valid, the user data bits are placed into the receive buffer using the Send Octet Number 207 to place them correctly. The variable V(R) is updated to indicate the highest octet of successive octets received. If a sufficiently large gap in the received user data stream is created by successive invalid LAPR frames, appropriate "Fill" bits values are transmitted on the reconstructed user data stream. The variable V(R) is updated appropriately whenever an octet of fill bits are substituted on the reconstructed user data stream. Resynchronization of the user data stream occurs immediately upon reception of a valid LAPR frame by use of the Send Octet Number 207.

Bit synchronicity is maintained by the receiver using the Send Octet Number 207 to place the received user data bits in the correct bit location modulo 32768. The receiver is also responsible for using the timing difference between reception of the LAPR frame and transmission of the corresponding user data bits on the reconstructed user data stream, and the network independent clock information to adjust the data transmitter clock of the reconstructed user data stream to maintain clock synchronization. If the data transmitter clock of the reconstructed user data stream is not adjusted to maintain clock synchronization with the entity transmitting the LAPR frames, receive buffer overrun or underrun may occur. These conditions are in general not recoverable.

The LAPR bit-sync mode ARQ method is a modification of the traditional Go-Back-N ARQ method. In the preferred embodiment, the manipulation of the V(S) and V(R) send and receive variables is based upon the octet numbers sent and received rather than frame numbers. Since the framing of octets into the LAPR frames is arbitary, a retransmitted octet may be in a different position of the LAPR frame than when originally transmitted.

Acknowledgment timers, used to time the expected acknowledgement from the LAPR receiver, are associated with the range of octet numbers of the octets transmitted in each frame rather than with frame numbers. When a LAPR bit-sync frame is transmitted, a timer is started. The timeout value is the expected time of the acknowledgement from the LAPR receiver plus a small allowance for processing time variation. Associated with each timer is a range of octet numbers. When an acknowledgement is received, the Ack Octet Number is used to update receive variable V(R). All timers are then examined. If the lower octet number of the timer range is less than or equal to the Ack Octet Number, the lower octet number is set equal to the Ack Oct Number plus one. When a subsequent LAPR bit-sync frame is transmitted, the octet number of the oldest octet in the payload is examined. This octet number is compared to the upper octet of each timer range. If this number is less than or equal to the upper range octet number, the upper range octet number is set equal to this number minus one. If a timer's octet range becomes non-existent, the timer is cancelled. When a timer expires, subsequent frames begin transmitting at the octet whose octet number is equal to receive variable V(R). Since octets are packed into the payload starting with the newest octet, the first retransmitted frame after a timer expire is required only to contain the octet whose octet number equals variable V(R). If many new octets have been received from the user data stream, this octet may be the oldest octet in the payload. If only a few octets have been received from the user data stream, this octet may be anywhere in the payload.

The LAPR receiver acknowledges octets that have received correctly or octets that have been "filled" on the reconstructed user data stream. When the receiver's data buffer is empty, the receiver may acknowledge unreceived octets which will transmitted on the reconstructed user data stream a short time in the future in order to reduce wasted bandwidth on the air interface.

Figure 7:
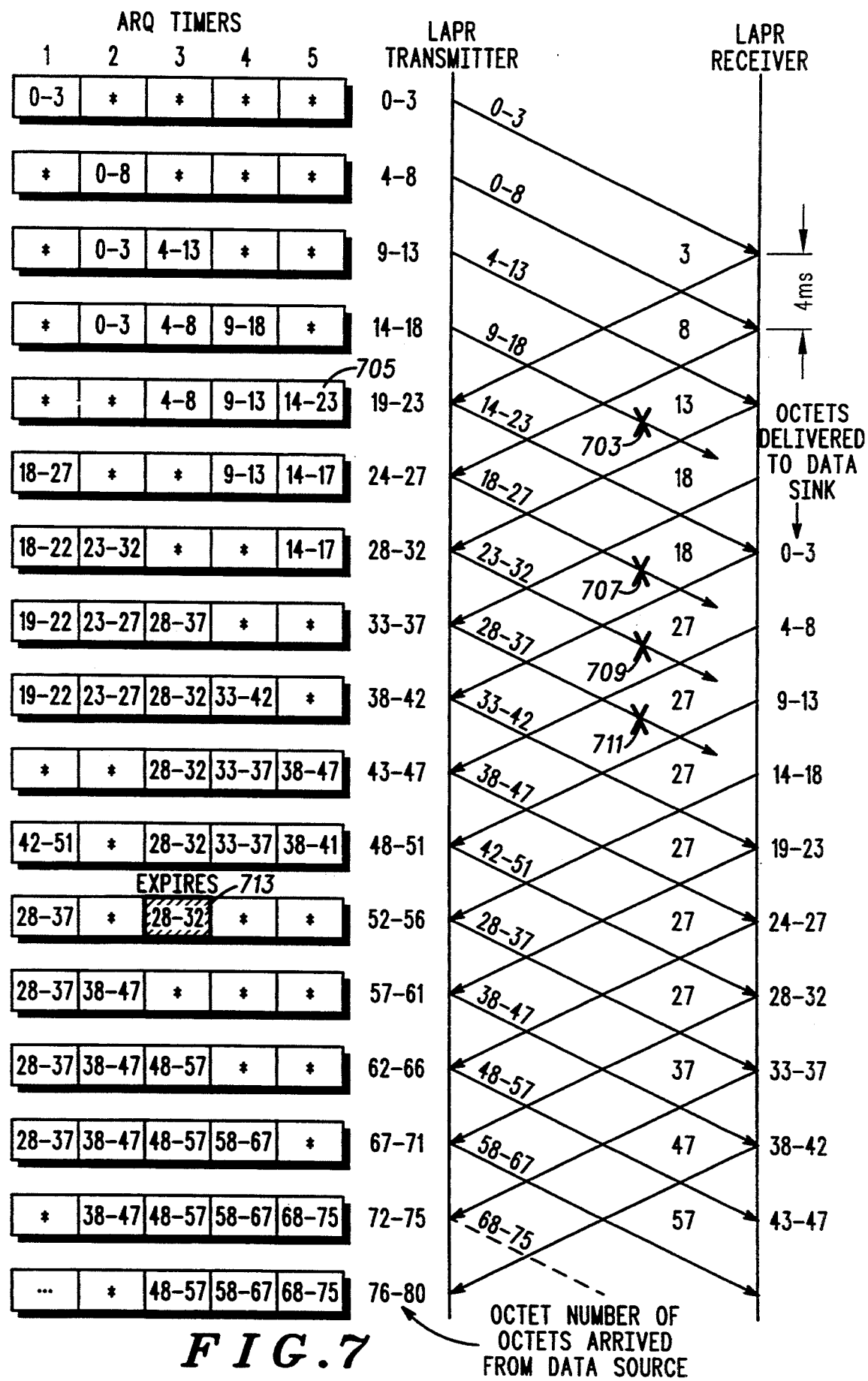
FIG. 7 is a ladder diagram of an ARQ acknowledgement interchange which may be employed in the present invention.

FIG. 7 shows an example of the operation of an ARQ acknowledgement interchange. Each arrow indicates the transmission of a LAPR frame from the transmitter to the receiver or an acknowledgement from the receiver to the transmitter. A LAPR frame and an acknowledgement are transmitted every four milliseconds. The number on the LAPR frame arrows indicates the range of octet number transmitted in that LAPR frame, the greatest of which is the Send Octet Number transmitted in the LAPR frame. The number on the acknowledgements represents the greatest octet number among the octets received by the receiver and is the Ack Octet Number. The ARQ timers are shown to the left and are updated after each LAPR frame is transmitted.. The range of numbers assocated with each timer is the range of octet numbers being supervised by that timer. As described above, the range of octet numbers associated with an ARQ timer can be reduced by receiving an acknowledgement with an Ack Octet Number greater than the lower number of the timer range, or when a subsequent LAPR frame is transmitted whose least octet number is less than the higher number of the timer range. An ARQ timer is canceled when its range is non-existent. In the example shown in FIG. 7, the fifth LAPR frame transmitted by the LAPR transmitter and containing octet numbered 14-23 is lost on the radio channel (indicated with an "X" at 703) and is not received correctly by the LAPR reciever. Note that the ARQ timer 705 with octet number range 14-23 does not expire and force a retransmission because the timer range is reduced to non-existence by acknowledgements received from the LAPR receiver and by the effect of subsequently transmitted LAPR frames. Further along in the example, the seventh, eighth, and ninth LAPR frames transmitted by the LAPR transmitter are lost on the radio channel (indicated by "X" 707,709, 711). Note that the loss of the seventh frame does not force the corresponding ARQ timer expire because its range is reduced to non-existence. However, note that the ARQ timer 713 corresponding to the eighth LAPR frame transmitted by the LAPR transmitter does expire, forcing a retransmission of octets starting at octet 28.

We claim:

1. An apparatus which conveys data over an unreliable transmission channel and maintains bit synchronicity, comprising:
   a packet generator which generates a plurality of data packets for conveyance over the transmission channel, each said data packet incorporating data source information into a plurality of data bytes, each of said plurality of data bytes containing a predetermined number of data bits of predetermined bit time, for assigning a unique number to each of said plurality of data bytes, said packet generator including in each said generated data packet an assigned unique number of a data byte in said generated data packet;
   a memory which stores data bits of said generated plurality of data packets conveyed over the transmission channel in sequence beginning with the bit of the byte having the lowest assigned unique number;
   a timing signal generator to generate a clock signal related to said predetermined bit time;
   a data bit transmitter which supplies said stored data bits to a data sink in a serial bit format starting with the first bit of the byte having the lowest assigned unique number and at a predetermined start time associated with said generated timing signal;
   a detector which determines when a data byte has not been received from said transmission channel and which determines the assigned unique number of said data byte not received; and
   a counter which associates said not-received data byte assigned unique number to a particular time of said timing signal such that the time during which the first and each following bit of the byte not received would be supplied to said data sink is determined, said data bit transmitter will supplying predetermined bit values to said data sink in serial bit format during said determined time when bits of said byte not received should be supplied to said data sink.

2. An apparatus which conveys data over an unreliable transmission channel and maintains bit synchronicity, comprising:
   means for generating a plurality of data packets, each said data packet incorporating data source information into a plurality of data bytes, each of said plurality of data bytes containing a predetermined number of data bits of predetermined bit time, for assigning a unique number to each of said plurality of data bytes, and for including in each said generated data packet an assigned unique number of a data byte included in said generated data packet;
   means for coupling said plurality of data packets to a transmission channel and for receiving said plurality of data packets from said transmission channel;
   means for storing data bits of said received plurality of data packets in sequence beginning with the bit of the byte having the lowest assigned unique number;
   means for generating a timing signal related to said predetermined bit time;
   means for supplying said stored data bits to a data sink in a serial bit format starting with the first bit of the byte having the lowest assigned unique number and at a predetermined start time associated with said generated timing signal;
   means for determining when a data byte has not been received from said transmission channel and for determining the assigned unique number of said data byte not received;
   means for associating said not-received data byte assigned unique number to a particular time of said timing signal such that the time during which the first and each following bit of the byte not received would be supplied to said data sink is determined; and
   means for supplying predetermined bit values to said data sink in serial bit format during said determined time when bits of said byte not received should be supplied to said data sink.

3. An apparatus in accordance with claim 2 further comprising means for acknowledging receipt of each received data packet and conveying said assigned unique number included in each said data packet.

4. An apparatus in accordance with claim 3 further comprising means for conveying said not-received data byte assigned unique number to said means for generating a plurality of data packets when said predetermined bit values are supplied to said data sink.

5. An apparatus in accordance with claim 3 further comprising means, responsive to said means for determining when a data byte has not been received, for again coupling the data packet incorporating said data byte not received to said transmission channel.

6. An apparatus in accordance with claim 5 further comprising:

means for receiving said again coupled data packet and storing bits of said data byte not received incorporated in said again coupled data packet, thereby gaining a replacement data byte;

means for associating said replacement data byte assigned unique number to a particular time of said timing signal such that the time during which the first and each following bit of the byte not received would be supplied to said data sink is determined; and means for supplying bit values of said replacement data byte to said data sink in serial bit format during said determined time when bits of said byte not received should be supplied to said data sink.

7. A method of conveying data over an unreliable transmission channel and maintaining bit synchronicity, comprising the steps of:

generating a plurality of data packets, each said data packet incorporating data source information into a plurality of data bytes, each of said plurality of data bytes containing a predetermined number of data bits of predetermined bit time, said generating step including the steps of assigning a unique number to each of said plurality of data bytes and including in each said generated data packet an assigned unique number of a data byte included in said generated data packet;

coupling said plurality of data packets to a transmission channel and receiving said plurality of data packets from said transmission channel;

storing data bits of said received plurality of data packets in sequence beginning with the bits of the byte having the lowest assigned unique number;

generating a timing signal related to said predetermined bit time;

supplying said stored data bits to a data sink in a serial bit format starting with the first bit of the byte having the lowest assigned unique number and at a predetermined start time associated with said generated timing signal;

determining when a data byte has not been received from said transmission channel and determining the assigned unique number of said data byte not received;

associating said not-received data byte assigned unique number to a particular time of said timing signal such that the time during which the first and each following bit of the byte not received would be supplied to said data sink is determined; and supplying predetermined bit values to said data sink in serial bit format during said determined time when bits of said byte not received should be supplied to said data sink.

8. A method in accordance with the method of claim 7 further comprising the step of acknowledging receipt of each received data packet and conveying said assigned unique number included in each said data packet.

9. A method in accordance with the method of claim 8 further comprising the step of conveying said not-received data byte assigned unique number to said means for generating a plurality of data packets when said predetermined bit values are supplied to said data sink.

10. A method in accordance with the method of claim 8 further comprising the step of again coupling the data packet incorporating said data byte not received to said transmission channel in response to said determination that a data byte has not been received.

11. A method in accordance with the method of claim 10 further comprising the steps of:

receiving said again coupled data packet and storing data bits of said data bytes not received incorporated in said again coupled data packet, thereby gaining a replacement data byte;

associating said replacement data byte assigned unique number to a particular time of said timing signal such that the time during which the first and each following bit of the byte not received would be supplied to said data sink is determined; and supplying bit values of said replacement data byte to said data sink in serial bit format during said determined time when bits of said byte not received should be supplied to said data sink.

* * * * *

UNITED STATES PATENT AND TRADEMARK OFFICE
CERTIFICATE OF CORRECTION

PATENT NO. : 5,426,643
DATED : Jun. 20, 1995
INVENTOR(S) : Smolinske and Tran

It is certified that error appears in the above-indentified patent and that said Letters Patent is hereby corrected as shown below:

Column 8, Line 12 "will supplying" should be --supplying--.

Signed and Sealed this

Fifth Day of December, 1995

Attest:

BRUCE LEHMAN

*Attesting Officer*  *Commissioner of Patents and Trademarks*